Patented July 2, 1946

2,403,226

UNITED STATES PATENT OFFICE 2,403,226

MANUFACTURE OF SULPHURIC ESTER-SALTS OF LEUCO QUINONES

Hans Z. Lecher, Plainfield, and Mario Scalera, Somerville, N. J., and Charles T. Lester, Emory University, Ga., assignors to American Cyanamid Company, New York, N. Y., a corporation of Maine No Drawing. Application January 17, 1944, Serial No. 518,584

18 Claims. (Cl. 260—323)

This invention relates to an improved process of preparing sulphuric ester salts of leuco quinones, especialy leuco vat dyestuffs, and more particularly the invention deals with the use of sulphur trioxide compounds of a certain class of tertiary amines in aqueous alkaline medium.

In spite of the great advantages of dyeing and printing procedures with sulphuric ester salts of leuco vat dyestuffs, these processes have not achieved as great commercial use as their outstanding technical advantages would lead one to expect. The reason for the limited use of the sulphuric ester salts is their very high cost which in turn results from the difficulty of converting the vat dyestuffs into the sulphuric ester salts of their leuco compounds by the processes which have hitherto been used. In the past this conversion has been generally effected by esterifying the leuco vat dyestuffs with sulphur trioxide compounds of various aromatic tertiary amines, particularly pyridine and dimethyl aniline in an excess of the anhydrous tertiary amine. These compounds have been used as esterification agents for the leuco vat dyestuff and also have been used in processes where the vat dyestuff is simultaneously reduced and esterified. These esterification agents have required an anhydrous medium as the sulphur trioxide aromatic amine compounds are rapidly hydrolyzed or otherwise decomposed in aqueous alkaline medium. Thus, the pyridine SO₃ compound actually has the pyridine ring opened by strong aqueous alkali. For this reason they have never been used in the past in any aqueous medium for the production of ester salts of leuco quinones, especially leuco vat dyestuffs. The requirements for an anhydrous medium have greatly complicated the process, necessitating extensive equipment for drying and recovering the solvent and for drying the dyestuff, and have been the major factor in the excessive cost of the resulting sulphuric ester salts.

According to the present invention we have found that sulphur trioxide derivatives of strongly basic tertiary amines, particularly non-aromatic tertiary amines, are capable of reacting with leuco quinones and especially leuco vat dyestuffs in aqueous alkaline medium with such speed that no serious hydrolysis results since these compounds are materially more stable to hydrolysis in alkaline medium. Thus, in order to obtain e. g. sulphuric ester-salts of leuco vat dyestuffs by our novel process, it is merely necessary to vat the dyestuff by any of the well known methods, such as e. g. by the aid of hydrosulphite and alkali, then to add the sulphur trioxide compound of the tertiary base to the aqueous vat and agitate the reaction mixture for a short period of time at room temperature, or slightly above. The sulphuric ester-salts are formed readily and in many cases in quantitative yields, and if so desired, they may be directly isolated from the aqueous solution in the form of their salts by addition of an appropriate salting agent.

The present invention is not limited to particular tertiary amines but it is necessary for practically useful results that the amines should have a dissociation constant of at least $1 \times 10^{-7}$ at 25° C. Examples of such amines are simple tertiary alkyl amines, such as trimethylamine, triethylamine, the tripropylamines, the tributylamines; unsaturated straight chain amines, such as triallylamine; aralkylamines, such as dimethyl benzylamine and diethyl benzylamine; alicyclic amines, such as cyclohexyl dimethylamine, cyclohexyl diethylamine, cyclopentyl dimethylamine; and heterocyclic amines of aliphatic character such as N-methyl morpholine, N-ethyl morpholine, and N-ethyl piperidine.

The sulphur trioxide addition products with which the present invention is concerned are now generally regarded as internal salts of tri-substituted sulphamic acids and are represented by the following formula:

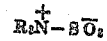

Some of these products are known and others are themselves new compounds. They may be prepared in a number of ways which are in general known, such as the action of sulphur trioxide or agents capable of generating sulphur trioxide on tertiary bases. They are quite different in nature from the corresponding addition products of aromatic amines such as dimethylaniline or pyridine. They show much greater stability to water from which some of them may be recrystallized and they resist aqueous alkali sufficiently to permit ready reaction with leuco quinones.

The stability of the strong tertiary amine-sulphur trioxide addition products is all the more surprising in view of the fact that they are extremely reactive in alkaline medium, reacting rapidly with leuco quinones in alkaline aqueous medium. This anomalous behavior was unpredictable, as normally one would expect that stability toward hydrolysis would be associated with low reactivity. The reason for this surprising behavior is not fully known, but it seems probable that at least one factor is the strength of the base since markedly poorer results are obtained when bases are used having dissociation constants less than $1 \times 10^{-7}$. While all of the sulphur trioxide addition products of the present invention are useful, they differ to some extent among themselves, both as to stability and as to solubility. Thus, for example, the sulphur trioxide compound of N-ethyl morpholine is considerably more stable than that of N-methyl morpholine. The solubility also varies, and last but not least, the rate of esterification is not constant and will depend on the amine compound chosen as well as the leuco quinone. With compounds showing high stability against hydrolysis and rapid reaction rate with the leuco quinone good results may be obtained with only a small excess of the amine compound. Compounds having higher rates of hydrolysis as compared with esterification rate require larger excesses. The choice of the compound to be used depends not only on the excess required but also on its cost.

It is an advantage of the present invention that in general the process works well at room temperature or slightly above. High temperatures which were necessary in the past can be avoided. The optimum temperature will vary somewhat with the leuco quinone and with the particular amine-sulphur trioxide compound used.

A further advantage of the present invention is that in most cases the amine which is produced by the reaction may be recovered. The reaction is normally considered to proceed in accordance with the following equation:

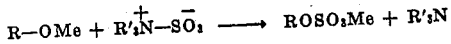

$$R-OMe + R'_3\overset{+}{N}-\overset{-}{SO_3} \longrightarrow ROSO_3Me + R'_3N$$

The regenerated amine may be recovered in various ways. Where it is very volatile as trimethylamine the crude reaction product may be heated and the amine volatilized. With less volatile amines it is preferable to separate the ester salt by salting out and recover the amine later from the mother liquor, either by stripping or salting out with caustic alkali. The relatively slight excess of the amine used is an important factor influencing the cost of the process as the recovering of large amounts of amine used as solvent in the old processes was a large factor in increased costs.

The process of the present invention is also flexible with regard to the vatting step in the case of vat dyestuffs. The production of the ester salt may be in two steps, first vatting and then reacting the leuco compound with the sulphur trioxide-tertiary amine compound in alkaline solution. This procedure has the advantage of minimum hydrolysis of the sulphur trioxide amine compound. It requires, however, two separate operations and where the quinone is very easily vatted at relatively low temperatures the amine sulphur trioxide compound may be present during the vatting operation, the two steps being then carried out in a single operation with corresponding saving of time and equipment.

While the use of water as an esterification medium is the most important feature of the present invention it is not necessary to use water alone, and other solvents which are miscible with the aqueous alkaline solution and which are compatible with the other reactants may be added to the aqueous medium. Examples of such solvents are lower aliphatic alcohols, acetone, pyridine, polkyalkylene oxides and their ethers. The possibility of using such mixed solvents adds a desirable flexibility to the process as certain leuco quinones are only sparingly soluble in water and the use of a mixed solvent permits improved procedure, especially with dyestuffs which do not vat readily in water alone.

The present invention is applicable to the esterification of leuco compounds of simple quinones which are not dyestuffs such as hydroquinone, catechol, naphthohydroquinone, anthrahydroquinone, 2-amino anthrahydroquinone, N-acetyl-2-amino anthrahydroquinone, and the like. Where an amino or imino group is present it is usually converted into a sulphamic group.

As has been pointed out above, the most important class of leuco quinones esterifiable by the present invention are the leuco compounds of vat dyestuffs. Typical examples are the leuco quinones of indigoid dyestuffs such as indigo; 7,7'-dimethyl indigo, 5,5'-dibromo indigo, 5,5',-7,7'-tetrabromo indigo, hexabromo indigo, halogenated naphthalene indol indigo, and 2,4-dibromo indol anthracene indigo. Another group of indigoid dyestuffs are the thioindigoids, such as thioindigo, 6,6'-diethoxy thioindigo, 4,4'-dimethyl-6,6'-dichloro thioindigo, 5,5'-dichloro-7,7'-dimethyl thioindigo, 4'-methyl-6'-chloro-6-ethoxy thioindigo, 4,5,4',5'-dibenzthioindigo. Thionaphthene-indolindigos and thionaphthene-acenaphthene indigos are also included.

Another very important class of leuco vat dyestuffs are the leuco compounds of anthraquinonoid vat dyestuffs. As examples of these may be mentioned the anthraquinone triazine vat dyestuffs such as the condensation product of 1 mol. of cyanuric chloride with 3 mols. of 1 amino anthraquinone; the anthrapyrimidines such as 2',5'-dichloro-4-benzoylamino-1,9-anthrapyrimidine; the indanthrenes such as indanthrene itself, and 3,3'-dichloro-N,N'-dihydro-1,2,1',2'-anthraquinone azine; flavanthrone; the dibenzanthrones such as dibenzanthrone, bz-2-bz-2'-dimethoxy dibenzanthrone; isodibenzanthrone and its halogen derivatives; dibenzpyrene quinones such as 3,4,8,9-dibenzpyrene quinone and its halogenated derivatives; anthanthrone and its halogenation products; pyranthrone and its halogen derivatives; anthrimide carbazoles such as 1,1'4'1''-trianthrimide-2,2'3'2''-dicarbazole; anthraquinone acridones such as anthraquinone-1(N),2-naphthacridone, bz-2-bz-4,4-trichloro-anthraquinone-1(N),2-benzacridone, and anthraquinone-2,1(N),6,5(N)-dibenzacridone; anthraquinone azoles such as anthraquinone-1,2-(N),5,6,(N)-di(phenylthiazole); benzanthrone anthraquinone acridines such as the dyestuff of the formula:

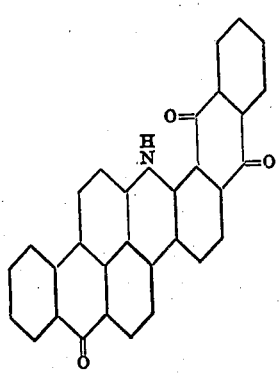

and its substitution products.

Leuco compounds of various perylene tetracarboxylic acid imides are also useful in the present invention such as the dimethylimide. Other typical examples are derivatives of naphthalene tetracarboxylic acids such as the dyestuff of the formula:

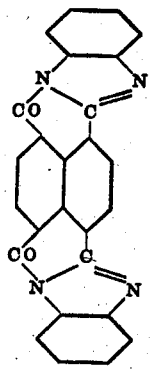

and its "trans" isomer.

The invention may be illustrated by the following examples, all parts being by weight. The vatting procedures are not described in detail since they are well known in the art. It is advantageous to use finely divided vat dyestuffs in the form of pastes or filter cakes. However, the amount of water given in the examples indicates always the total amount.

Example 1

Indigo

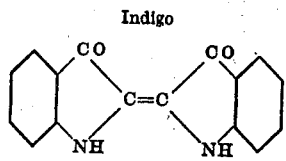

A mixture of 157 parts of indigo with a solution of 173 parts of sodium hydroxide and 153 parts of sodium hydrosulphite in 2,000 parts of water is agitated, air being excluded, until the clear yellow vat of the eye results. To this solution is now added 280 parts of the sulphur trioxide compound of N-ethyl morpholine (prepared, for instance, by the action of chlorosulphonic acid on N-ethyl morpholine in an inert organic solvent; white crystals, M. P. 150°). The mixture is agitated at 30–40° C. for 4 hours, air being excluded, and then air is blown through to oxidize small amounts of unchanged leuco indigo. The solution is filtered. The clear amber filtrate contains the disulphuric ester-salt of leuco indigo, and may be used directly for dyeing.

If it is desired to isolate the ester-salt in crystalline form, the clear solution is diluted to a concentration of approximately 3% real dye, and 10 parts of potassium carbonate and 20 parts of potassium chloride are added for every 100 parts of solution. The dipotassium salt of the desired ester then crystallizes out quantitatively in the form of white crystals, which may be filtered and dried.

In a similar manner, if desired, the disodium salt may be isolated by the addition of 10 parts sodium carbonate and 20 parts of sodium chloride for every 100 parts of solution.

If in the above example the ethyl morpholine SO3 is replaced by pyridine SO3, only a negligible yield (5–6%) of the disulphuric ester is obtained, even when care is taken to minimize the hydrolysis of the pyridine sulphur trioxide compound by reducing the alkalinity of the medium.

Example 2

Bz-2,bz-2′-dimethoxydibenzanthrone

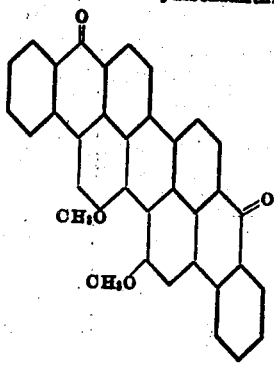

A mixture of 155 parts of bz-2,bz-2′-dimethoxy-dibenzanthrone with a solution of 76 parts of sodium hydroxide and 77 parts of sodium hydrosulphite in 2,000 parts of water is agitated, the oxygen of the air is excluded by passing through the reaction vessel a stream of an inert gas. When reduction is complete (which is the case within 30 to 40 minutes at room temperature), 140 parts of the sulphur trioxide compound of N-ethyl morpholine are added, and agitation is continued for 2 or 3 hours longer at 30–40° C.

The deep blue color of the solution, indicating the sodium salt of the leuco compound, soon changes to a bluish red, and eventually to a yellowish red. This indicates completion of the reaction; such completion can also be tested for, if desired, by withdrawing a sample and exposing it to the action of air. When a sample so treated no longer separates a green precipitate, esterification is complete.

The red solution is now treated with a stream of air to oxidize traces of unchanged leuco dyestuff, and then clarified, advantageously by the addition of some Super-Cel, by passing it through a filter. The clear, brownish red filtrate is stable to further action of air, and dyes both vegetable and animal fibers red-brown tints, which completely revert to a brilliant Jade Green on immersion in a dilute mineral acid-sodium nitrite bath.

The crystalline sulphuric ester-salt may be easily isolated, if desired, by adding to the clear solution, preferably at slightly elevated temperatures (60–70°), 25 parts of sodium chloride and 5 parts of sodium carbonate per 100 parts of the solution. The yield is practically quantitative and the disodium salt of the disulphuric acid ester of leuco bz-2,bz-2′-dimethoxy dibenzanthrone separates out as large crystals, which may be filtered and dried in vacuo, or dispersed into a paste, which is very stable.

Example 3

5,5′,7,7′-tetrabromo indigo

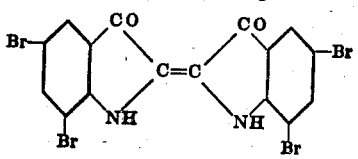

346 parts of 5,5′,7,7′-tetrabromo indigo are agitated, under exclusion of air, with a solution of 173 parts of sodium hydroxide and 153 parts of sodium hydrosulphide in 3,000 parts of water. When reduction is complete, as evidenced by the total disappearance of blue color from the suspension, 281 parts of the sulphur trioxide compound of N-ethyl morpholine are added, and agitation is continued, under exclusion of air, at 40-50° C. for 2 hours longer.

Air is then blown through the clear solution, the small amount of non-esterified dyestuff is removed by filtration, and the clear, amber filtrate is treated, slowly and with stirring, with 600 parts of sodium chloride. The disodium salt of the disulphuric acid ester of leuco tetrabromo indigo separates in excellent yield as a white, crystalline powder which is washed with 20% sodium carbonate solution, filtered and dried.

Example 4

3,4,8,9-dibenzpyrene-5,10-quinone

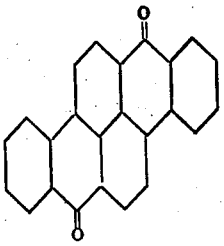

330 parts of 3,4,8,9-dibenzpyrene-5,10-quinone, advantageously in finely dispersed form, are agitated with a solution of 230 parts of sodium hydrosulphite and 190 parts of sodium hydroxide in 3,500 parts of water, under exclusion of oxygen, until a solution of the vat of the dyestuff results. To this solution are added 270 parts of the sulphur trioxide compound of N-ethyl morpholine, and agitation is continued at room temperature for several hours.

The solution is then aerated and filtered to remove any unconverted dyestuff still present.

The clear, greenish yellow filtrate, quite stable to air, may be used directly for dyeing. If desired, the disulphuric acid ester may be isolated in the usual manner, for instance as sodium salt, by adding sodium chloride to the solution. The disodium salt thus obtained in good yield is a nearly colorless powder readily soluble in water to a clear solution.

Example 5

6,6'-diethoxy thioindigo

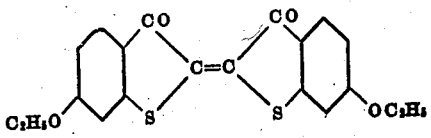

280 parts of 6,6'-diethoxy thioindigo are vatted with a solution of 230 parts of sodium hydrosulphite and 190 parts of sodium hydroxide in 3,500 parts of water substantially by the same procedure as described in previous examples. When reduction is complete 270 parts of the sulphur trioxide compound of N-ethyl morpholine are added to the solution, and agitation is continued for several hours at room temperature.

After aeration and removal of unconverted dyestuff, the disulphuric ester-salt of leuco diethoxy thioindigo, which is obtained in good yield, may be isolated from the clear filtrate by adding sodium chloride thereto.

Example 6

Bz-2,bz-2'-dimethoxy dibenzanthrone

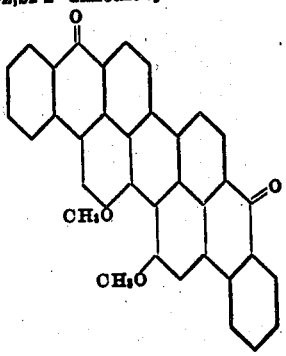

50 parts of bz-2,bz-2'-dimethoxy dibenzanthrone are vatted with a solution of 23 parts of sodium hydrosulphite and 32 parts of sodium hydroxide in 350 parts of water. When vatting is complete, the clear blue solution is treated with 60 parts of the sulphur trioxide compound of trimethylamine and agitation is continued, under exclusion of air, for several hours at room temperature. The blue color of the solution turns to a clear brownish red. Conversion to the disulphuric acid ester is practically quantitative.

The solution, after filtering from traces of suspended material, is identical to that obtained according to Example 2. It may be concentrated in vacuo to a paste of the sodium salt of the leuco ester. If desired, the crystalline disodium salt of the ester may be isolated as described in Example 2.

Example 7

Indigo is vatted as in Example 1. To the solution obtained there is added 250 parts of the sulphur trioxide compound of trimethlylamine and agitation is continued for 8 hours at room temperature, in an inert atmosphere.

The solution is aerated and filtered from traces of unesterified dye. The disulphuric acid ester of leuco indigo, obtained in excellent yield, may be isolated as its alkali-metal salt by the procedure set forth in Example 1.

Example 8

Bz-2,bz-2'-dimethoxy dibenzanthrone

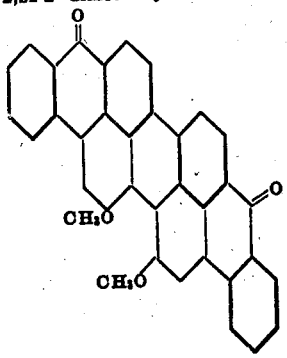

45 parts of bz-2,bz-2'-dimethoxy dibenzanthrone are vatted with a solution of 21 parts of sodium hydrosulphite and 18 parts of sodium hydroxide in 350 parts of water at room temperature and under exclusion of air. As soon as reduction is complete, as evidenced by a clear blue solution, 45 parts of the sulphur trioxide compound of dimethyl cyclohexylamine (prepared by the action of chlorosulphonic acid on dimethyl cyclohexylamine in an inert organic diluent; white crystals, M. P. 86-88° C.) are added. The mass is agitated for several hours, until a sample, on aeration, shows no formation of a green color. At this point the reaction mixture contains the bright red, crystalline precipitate of the cyclohexyl dimethylamine salt of the disulphuric acid ester of the dyestuff. The conversion is quantitative.

If desired, the sodium salt may be isolated by diluting the suspension with equal parts of water, and precipitating with sodium chloride as described in Example 2.

Example 9

5,5'-dichloro-7,7'-dimethyl thioindigo

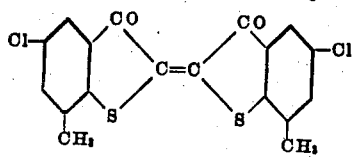

23 parts of 5,5'-dichloro-7,7'-dimethyl thioindigo are vatted with a solution of 23 parts of sodium hydrosulphite and 19 parts of sodium hydroxide in 175 parts of water and 175 parts 95% ethylalcohol. Then 45 parts of the sulphur trioxide compound of dimethyl cyclohexylamine are added, and agitation continued for several hours under exclusion of air.

Air is now blown through the mass to oxidize any unchanged leuco present, and filtered. The clear amber filtrate contains the disulphuric acid ester of the leuco dichloro dimethyl thioindigo. If desired, this may be isolated as its disodium salt evaporation of the alcohol and addition of sodium chloride or carbonate.

Example 10

52 parts of indigo are vatted with a solution of 46 parts of sodium hydrosulphite and 32 parts of sodium hydroxide in 1000 parts of water as described in Example 1. To the yellow solution there is added the sulphur trioxide compound of dimethyl cyclohexylamine (90 parts), and agitation is continued for several hours. Then air is admitted to the solution, and the small amount of unesterified dyestuff is removed by filtration.

The filtrate contains the disulphuric acid ester of leuco indigo, obtained in very good yield. It may be isolated as one of its alkali metal salts, if so desired, by addition of the appropriate alkali-metal chloride, as described in Example 1.

Example 11

Bz-2,bz-2'-dimethoxy dibenzanthrone

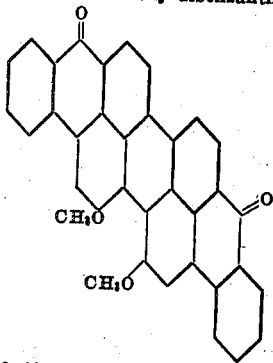

A leuco solution is prepared from 45 parts of bz-2,bz-2'-dimethoxy dibenzanthrone and a solution of 20 parts of sodium hydroxide and 23 parts of sodium hydrosulphite in 350 parts of water as set forth in Example 2.

To the deep blue solution there is added 45 parts of the sulphur trioxide compound of triethylamine (prepared by the action of chlorosulphonic acid on triethylamine; white crystalline solid, M. P. 91° C.), and agitation is continued at room temperature until the color of the solution has changed to a deep brownish red.

The solution thus obtained is aerated and filtered. The filtrate, clear yellowish red, contains the disulphuric ester of leuco dimethoxy dibenzanthrone. The product may be isolated as its disodium salt as described in Example 2. The yield is almost quantitative.

Example 12

A vat is prepared as described in Example 11. To the deep blue vat is added 45 parts of the sulphur trioxide compound of triallylamine (prepared by the action of chlorosulphonic acid on triallylamine) and the solution is agitated for some hours at 30° C.

The disodium salt of the disulphuric acid ester of dimethoxy dibenzanthrone may be isolated as described in Example 2, and is obtained in nearly quantitative yield.

Example 13

157 parts of indigo are slurried into 2,000 parts of water and, while excluding air, there are added 187 parts of sodium hydroxide, 151 parts of sodium hydrosulphite, and 250 parts of trimethylamine $SO_3$.

The slurry is agitated at room temperature or slightly above for six hours. The blue color disappears and a dark yellow brown solution results. Air is blown through this solution to precipitate any unesterified dyestuff. The mixture is then filtered.

From the filtrate the sulphuric acid ester of leuco indigo is obtained in good yield by salting as described in Example 1.

Example 14

159 parts of 2-acetylaminoanthraquinone are vatted at room temperature in 2,500 parts of water by means of 200 parts of caustic soda and 150 parts of sodium hydrosulphite. To the clear, dark red vat is now added N-ethyl morpholine $SO_3$ (420 parts) and the mixture is agitated three hours at room temperature under exclusion of air.

The red color turns to a dark brown. By blowing air through the solution a small amount of non-esterified material is precipitated and may be removed by filtration.

The clarified filtrate contains the leuco disulphuric ester of the 2-acetylaminoanthraquinone.

Example 15

134 parts of beta amino anthraquinone in the form of a presscake are slurried in water to a volume of 300 parts (by volume). To this slurry there is added 223 parts of sodium hydroxide and 151 parts of sodium hydrosulphite, while excluding air. The red vat is formed immediately and 527 parts of N-ethyl morpholine $SO_3$ are then added thereto.

The slurry is agitated for four hours at room temperature in an inert atmosphere. Air is blown through the charge, and the small amount of non-esterified beta amino anthraquinone is removed by filtration.

Example 16

110 parts of hydroquinone are dissolved in 1,000 parts of water and 250 parts of caustic potash (85%) preferably under exclusion of air. The clear solution is cooled to 20° C. and 450 parts of the N-ethyl morpholine-sulphur trioxide compound is added. The mixture is agitated for several hours, filtered, and the residue is washed with a cold dilute caustic potash solution.

The crystalline product consists of the dipotassium salt of the disulphuric ester of hydroquinone, and is contaminated with potassium sulphate. It may be obtained in a very pure state by dissolving it in a small amount of water, precipitating the sulphate ions with barium hydroxide and salting the filtered solution with potassium carbonate. In this condition it exists as white crystals which melt with decomposition at 287–289° C. (uncorr.).

In most of the examples the alkali used is a sodium compound and the corresponding sodium salts of the esters are produced. Since the particular cation is not important and any water soluble salt is useful the sodium salts are preferred because they are the cheapest. However, it should be understood that the invention is in no sense limited thereto, excellent results being obtained with potassium salts, but there is usually no advantage which would justify their use from the standpoint of cost. However, in the salting out step the lower solubility of potassium salts of certain leuco esters make them economically desirable. For certain uses salts of organic bases such as quaternary nitrogen bases are advantageous.

In the specification and claims, the term "dispersed in a medium" is used in its broad sense to include dispersions of molecules as well as larger particles.

We claim:

1. A process for the manufacture of water soluble sulphuric ester salts of leuco quinones which comprises reacting the leuco quinones with the sulphur trioxide compounds of tertiary amines in an alkaline aqueous medium, the said aqueous medium containing water as the major constituent thereof, the leuco quinones being dispersed in said aqueous medium, and said amines being tertiary amines having a dissociation constant of at least $1 \times 10^{-7}$ at 25° C.

2. A process for the manufacture of water soluble sulphuric ester salts of leuco quinone vat dyestuffs which comprises reacting the leuco vat dyestuffs with the sulphur trioxide compounds of tertiary amines in an alkaline aqueous medium, the said aqueous medium containing water as the major constituent thereof, the leuco vat dyestuffs being dispersed in said aqueous medium, and said amines being tertiary amines having a dissociation constant of at least $1 \times 10^{-7}$ at 25° C.

3. The process of claim 2 wherein said tertiary amine is a trialkylamine.

4. The process of claim 2 wherein said tertiary amine is triethylamine.

5. The process of claim 2 wherein said tertiary amine is N-ethylmorpholine.

6. The process of claim 1 wherein said leuco quinones are leuco compounds of simple quinones which are not dyestuffs.

7. The process of claim 2 wherein said leuco vat dyestuffs are leuco indigoid vat dyestuffs.

8. The process of claim 2 wherein said leuco vat dyestuffs are leuco anthraquinone vat dyestuffs.

9. The process of claim 2 wherein said vat dyestuff is tetrabromo indigo.

10. The process of claim 2 wherein said vat dyestuff is bz-2,bz-2'-dimethoxydibenzanthrone.

11. A method of manufacturing water soluble sulphuric ester salts of leuco quinones which comprises subjecting the quinones in an alkaline aqueous medium to simultaneous reduction by aid of a reducing agent and an esterification with a sulphur trioxide compound of a tertiary amine, the said aqueous medium containing water as the major constituent thereof, the leuco quinones being dispersed in said aqueous medium and said amine being a tertiary amine having a dissociation constant of at least $1 \times 10^{-7}$ at 25° C.

12. A method of manufacturing water-soluble sulphuric ester salts of leuco quinone vat dyestuffs which comprises subjecting the vat dyestuffs in an alkaline aqueous medium to simultaneous reduction by aid of a reducing agent and an esterification with a sulphur trioxide compound of a tertiary amine, the said aqueous medium containing water as the major constituent thereof, the leuco vat dyestuffs being dispersed in said aqueous medium and said amine being a tertiary amine having a dissociation constant of at least $1 \times 10^{-7}$ at 25° C.

13. The process of claim 12 wherein said tertiary amine is a trialkylamine.

14. The process of claim 12 wherein said tertiary amine is triethylamine.

15. The process of claim 12 wherein said tertiary amine is N-ethylmorpholine.

16. The process of claim 11 wherein said leuco quinones are leuco compounds of simple quinones which are not dyestuffs.

17. The process of claim 12 wherein said leuco dyestuffs are leuco indigoid vat dyestuffs.

18. The process of claim 12 wherein said leuco vat dyestuffs are leuco anthraquinone vat dyestuffs.

MARIO SCALERA.
CHARLES T. LESTER.
HANS Z. LECHER.